United States Patent
Amimoto (10) Patent No.: US 6,545,777 B1
(45) Date of Patent: Apr. 8, 2003

(54) IMAGE READING APPARATUS (75) Inventor: Mitsuru Amimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,678

(22) Filed: Jun. 17, 1999

(30) Foreign Application Priority Data

Jun. 19, 1998 (JP) .......................................... 10-173002

(51) Int. Cl.$^7$ ................................................ H04N 1/46
(52) U.S. Cl. ..................................... 358/509; 358/505
(58) Field of Search ................................. 358/509, 505, 358/506, 512–514; 250/234–236, 227.26, 205; 362/800

(56) References Cited

U.S. PATENT DOCUMENTS 5,625,470 A * 4/1997 Ueta et al. .................. 358/505
6,084,692 A * 7/2000 Ohtani et al. ............... 358/509

* cited by examiner

Primary Examiner—Cheukfan Lee (57) ABSTRACT

In a color scanner, three LEDs for irradiating an original with colors R, G, and B are so switched as to sequentially emit light for respective predetermined emission times, and a reading unit is moved to read the original. This invention reduces color misregistration occurring due to the differences between irradiation positions resulting from the switching. Of the RGB LEDs, the start point of the emission time of the G LED having the longest emission time is matched with the end point of the emission time of the R LED before this G LED. The B LED emits light after the end point of the emission time of the G LED.

21 Claims, 10 Drawing Sheets

FIG. 11

IMAGE READING APPARATUS

BACKGROUND OF THE INVENTION

1. Field of the Invention

The present invention relates to an image reading apparatus and method of continuously scanning an original by sequentially turning on a plurality of light sources, i.e., light sources of three primary colors R, G, and B, thereby performing color separation, and a computer-readable storage medium.

2. Related Background Art

Figure 11:
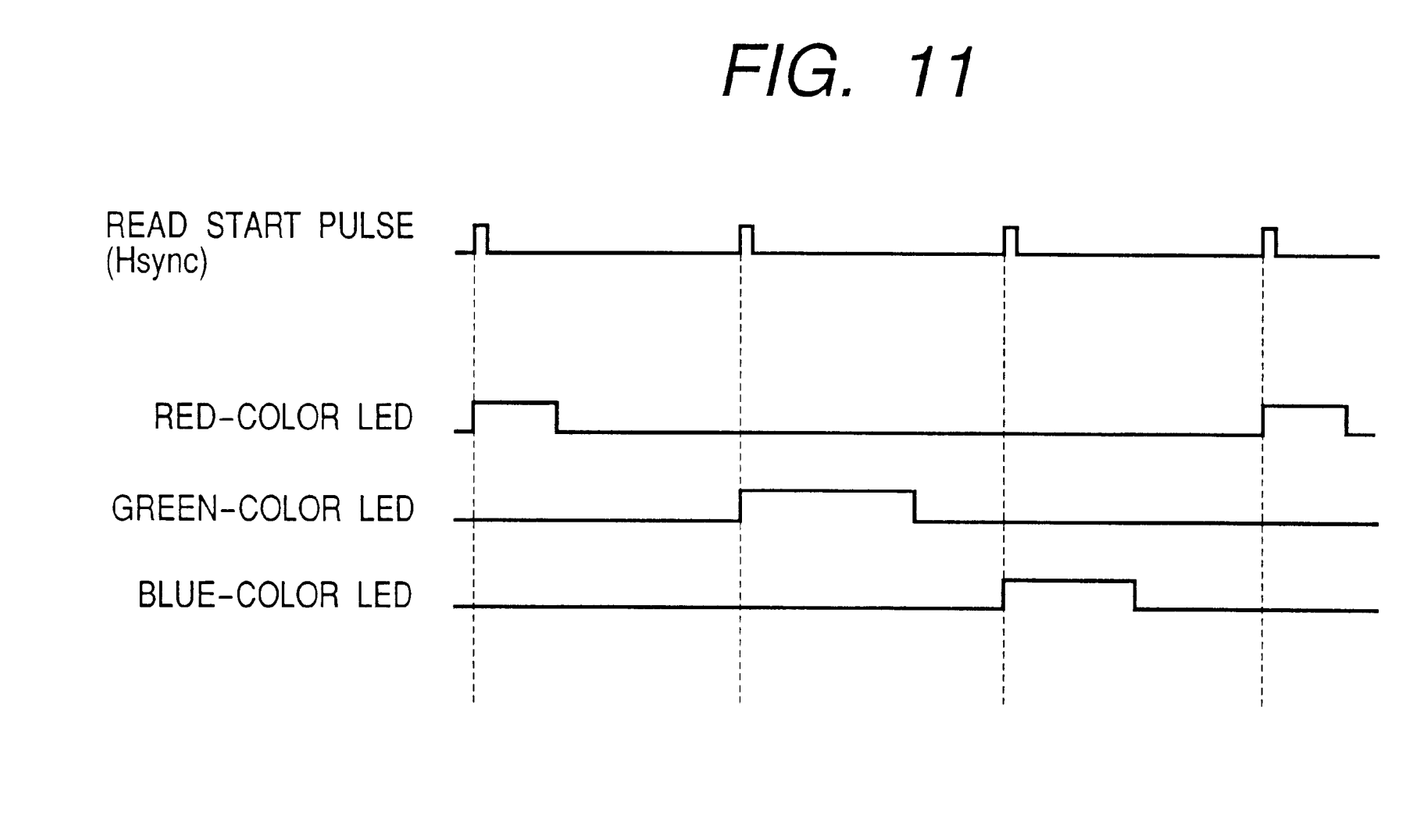
FIG. 11 is a timing chart of a conventional LED PWM control method.

As shown in FIG. 11, a conventional image reading apparatus for performing color separation by using a plurality of light sources, i.e., light sources of three primary colors R, G, and B, performs color separation by continuously scanning an original by moving a reading unit while sequentially turning on the light sources in synchronism with a read start pulse (Hsync) having a fixed period.

This conventional apparatus, however, scans an original by moving the reading unit while sequentially turning on the light sources. Therefore, in the process during which colors are switched by the sequential turn-on operation, the irradiation position of the original moves over time. This produces color misregistration when color separation is performed and thereby lowers the quality of image read.

SUMMARY OF THE INVENTION

It is an object of the present invention to reduce color misregistration and improve image quality.

To achieve the above object, an image reading apparatus according to the present invention comprises a plurality of light source means for emitting light components of different colors to illuminate an original, control means for allowing the light source means to sequentially emit light components only for respective predetermined emission times such that emission times of light source means other than a predetermined light source means are set close to an emission time of the predetermined light source means in a time-series manner, and photoelectric conversion means for reading an image on the original illuminated by the light source means and outputting an image signal while moving relative to the image.

With this arrangement, the time differences produced when the light sources are sequentially turned on can be reduced. Consequently, it is possible to reduce color misregistration caused by the differences between the irradiation positions of an original and improve the image read quality.

Other objects, features and advantages of the invention will become apparent from the following detailed description taken in conjunction with the accompanying drawings.

DESCRIPTION OF THE PREFERRED EMBODIMENTS

Embodiments of the present invention will be described below with reference to the accompanying drawings.

Figure 1A:
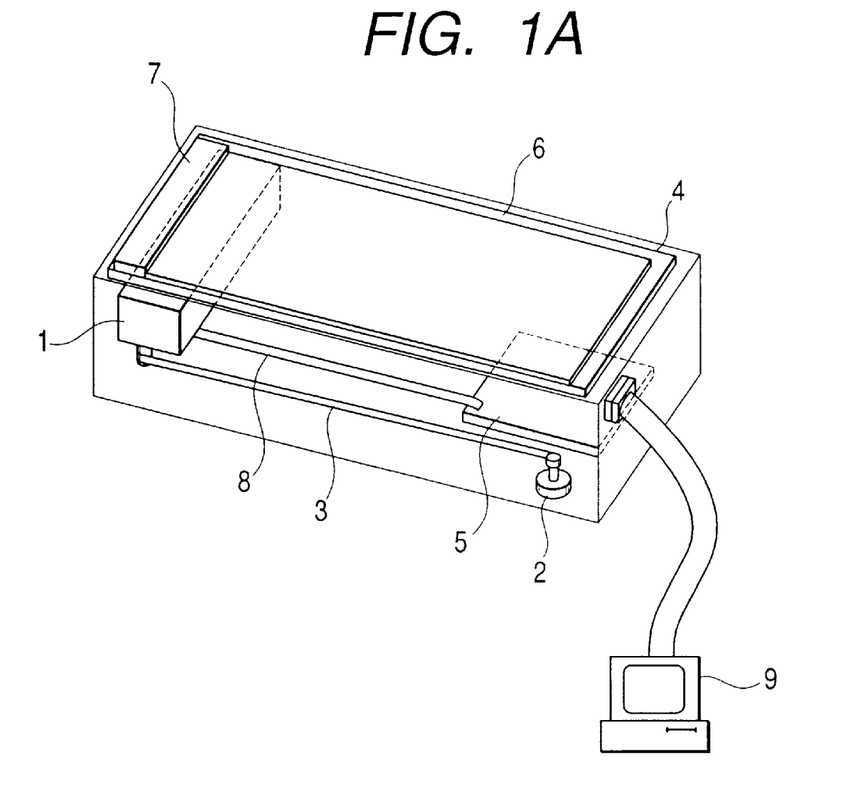
FIGS. 1A and 1B are views showing the arrangement of an embodiment of an image reading apparatus according to the present invention.
Figure 1B:
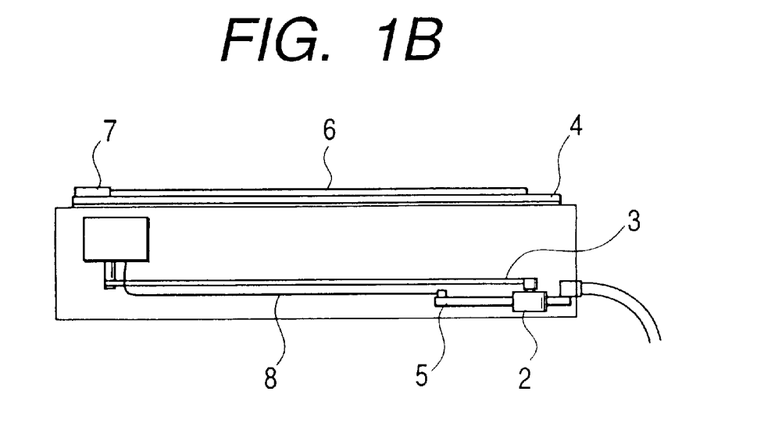

FIGS. 1A and 1B show an image reading apparatus according to the present invention. Referring to FIGS. 1A and 1B, this apparatus includes a reading unit 1, a stepping motor 2, a belt 3, an original glass table 4, a controller 5, an original 6, a white correction plate 7, a flat cable 8, and an external computer 9.

Figure 2:
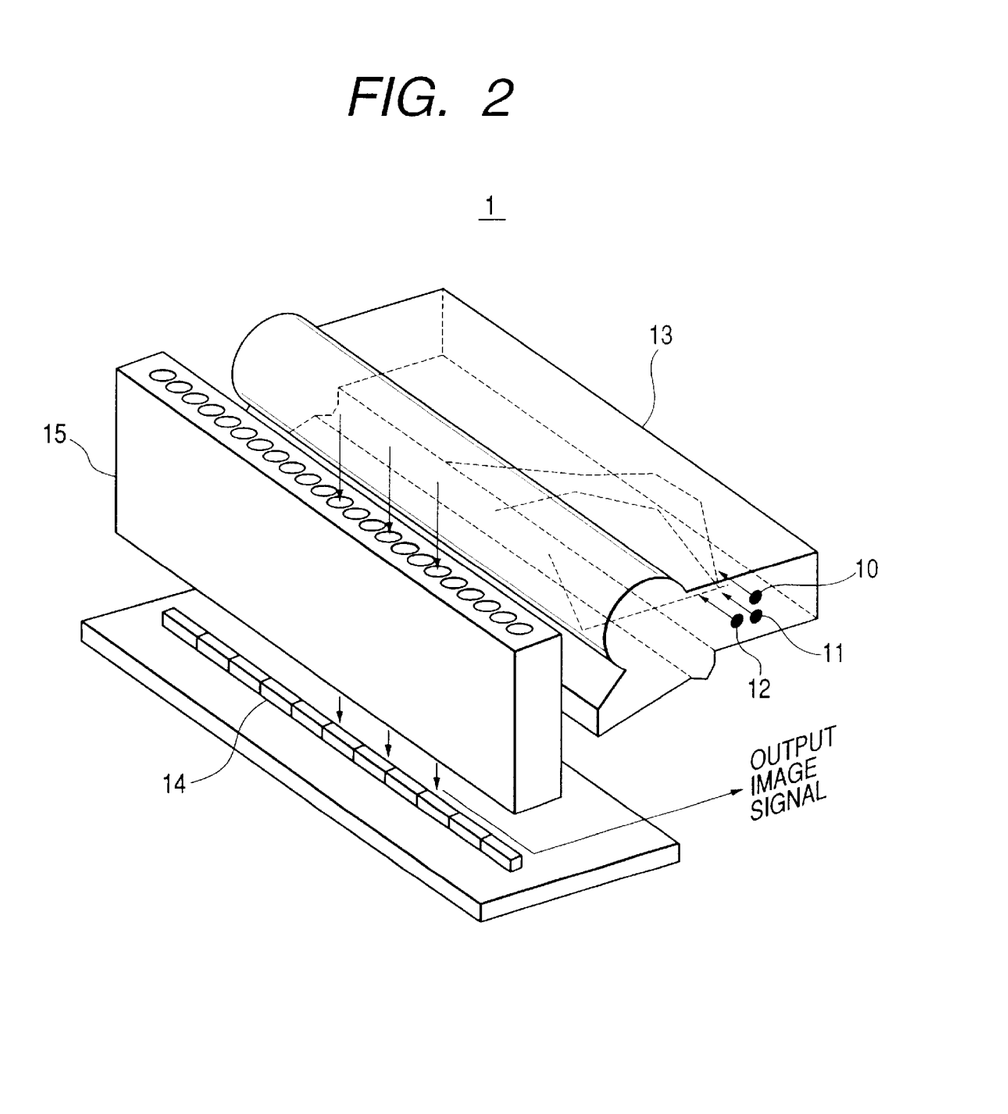
FIG. 2 is a view showing the structure of a reading unit.

FIG. 2 is a detailed view of the reading unit 1. That is, this reading unit 1 includes a red-color LED 10, a green-color LED 11, a blue-color LED 12, a light-guiding member 13, photoelectric conversion elements 14, and a rod lens array 15.

Figure 3:
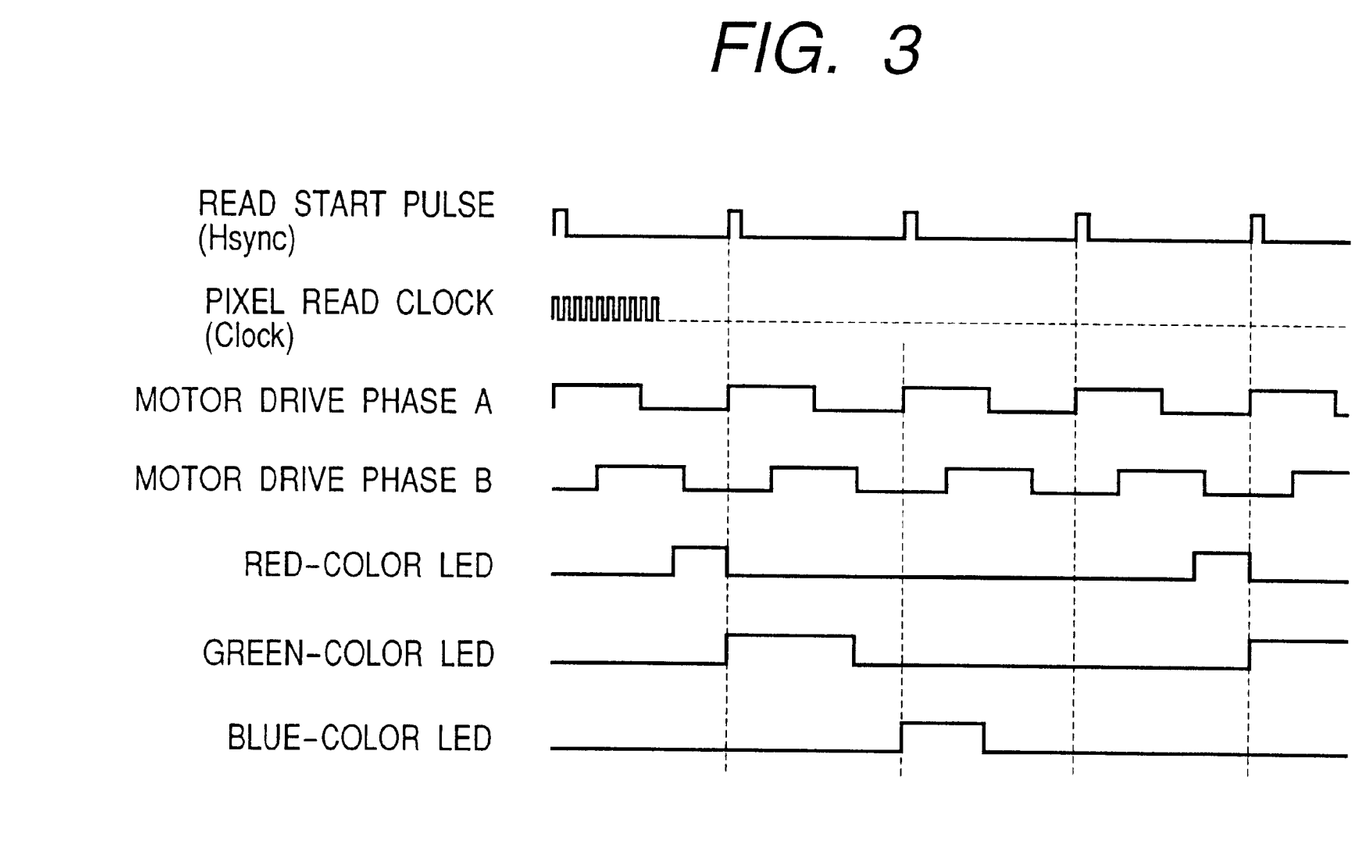
FIG. 3 is a timing chart showing operations.

FIG. 3 is a timing chart showing operations of the individual components of the reading unit 1.

Figure 4:
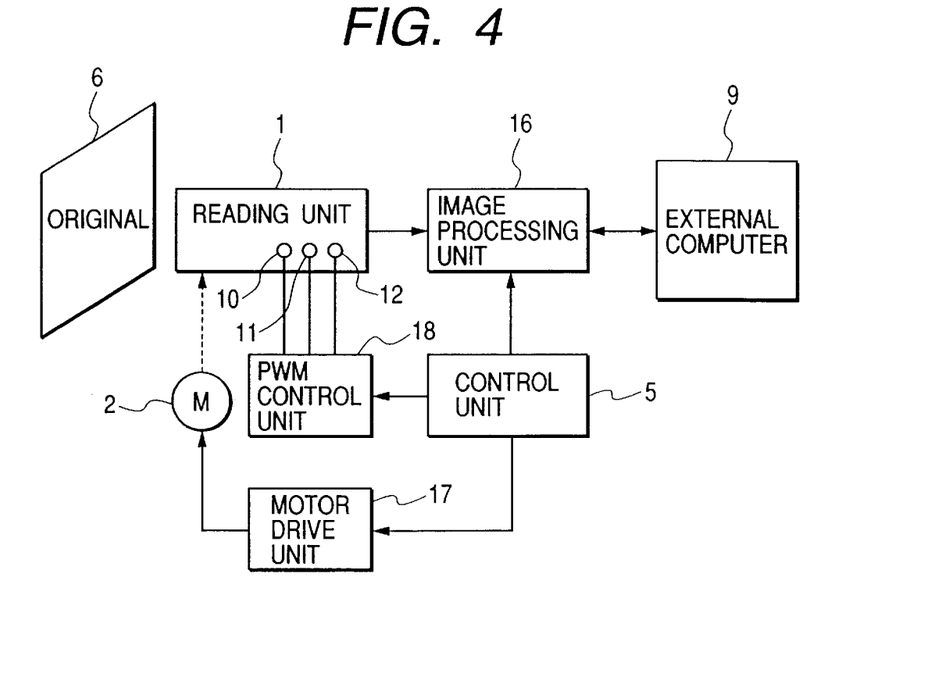
FIG. 4 is a block diagram of an electrical processing section.

FIG. 4 shows the configuration of an electrical processing section which includes the reading unit 1 having the LEDs 10, 11, and 12, the stepping motor 2, the controller 5, and the external computer 9 described above, and also includes an image processor 16, a motor driver 17, and a PWM controller 18 for the LEDs.

The operation of the image reading apparatus according to the first embodiment will be described below.

The controller 5 drives the stepping motor 2. In this embodiment, a four-phase motor is driven by two phases (only phases A and B are shown in FIG. 3). The belt 3 transmits this driving force to the reading unit 1. The reading unit 1 scans the original 6 while continuously moving along the original glass table 4.

The reading unit 1 will be described below. As shown in FIG. 2, the photoelectric conversion elements 14 attached to the reading unit 1 are arranged along the longitudinal direction of the reading unit 1. In this embodiment, the reading unit 1 has density equivalent to 300 DPI in the lateral direction of A4-size original, and photoelectric conversion elements corresponding to 2,756 pixels are arrayed.

The controller 5 supplies a pixel read clock (Clock) and a read start pulse (Hsync) having a predetermined period to the photoelectric conversion elements 14. Turn-on actions of the red-color LED 10, the green-color LED 11, and the blue-color LED 12 are switched for each read start pulse (Hsync). These LEDs 10, 11, and 12 are sequentially turned on in accordance with the movement of the reading unit 1. In this period, each of the LEDs 10, 11, and 12 emits light under PWM control only for a necessary ON period to obtain an image signal with an optimum output level. The light from each LED reaches the original surface while dispersed in the longitudinal direction of the reading unit 1 by the light guiding member 13. This light is reflected by the original surface and focused on the photoelectric conversion elements 14 by the rod lens array 15.

The photoelectric conversion elements 14 store electric charge upon receiving the light components emitted from the LEDs 10, 11, and 12 and reflected by the original surface. The charge is stored in a transfer unit of the photoelectric conversion elements 14 by the read start pulse (Hsync) in the next period and output as an electrical signal of one pixel by the pixel read clock (Clock). The controller 5 supplies the detected image signals color-separated by the LEDs 10, 11, and 12 to the external computer 9 through the flat cable 8. The external computer 9 performs image processing to form color read image data of one line including the three colors.

When red is read in a certain period, for example, green is read in the next period, and blue is read in the next period to the green read period. Therefore, a time lag of one period is produced between red and green, and a time lag of two periods is produced between red and blue. This means that the read position of the continuously moving reading unit 1 moves, so a phenomenon called color misregistration occurs during color read.

Figure 5:
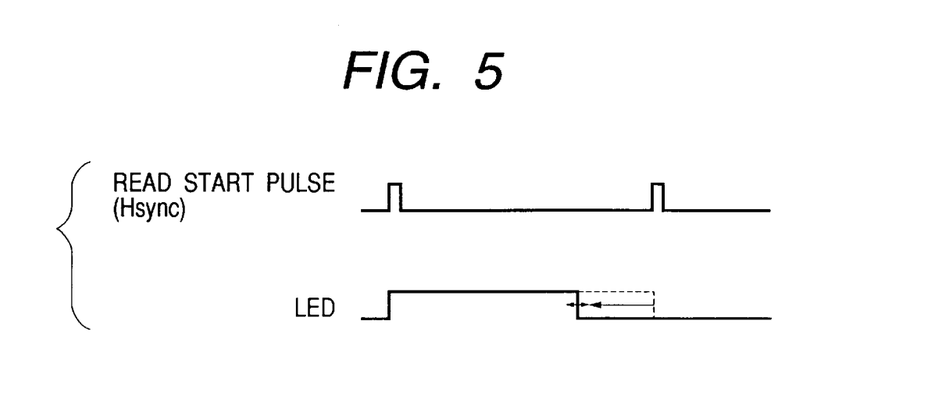
FIG. 5 is a timing chart showing the concept of an LED PWM control method.
Figure 6:
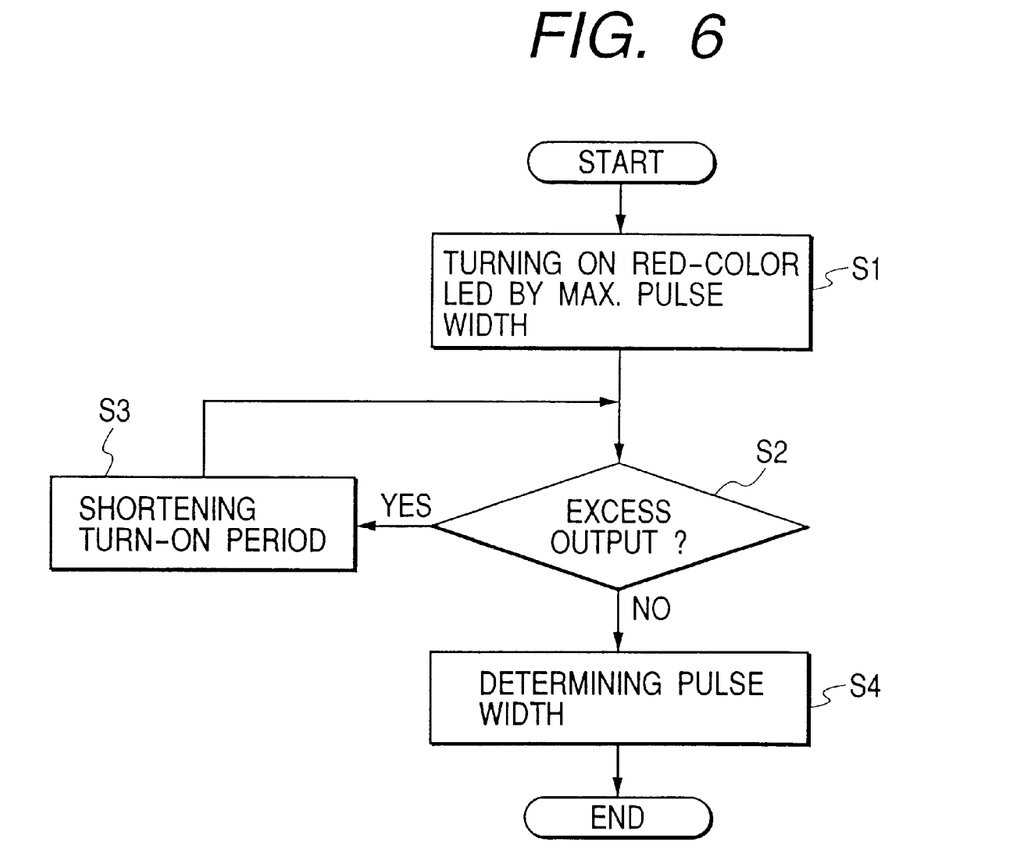
FIG. 6 is a flow chart of the LED PWM control method.

An LED emission PWM control method will be described below with reference to a timing chart in FIG. 5 and a flow chart in FIG. 6. The characteristics of an LED include variations in the forward voltage, variations in the current-emission characteristics, and the temperature dependence, and change in accordance with the color of emission. On the light-receiving side, the transmission characteristics of the optical system and the characteristics of the photoelectric conversion elements 14 have influences on the LED characteristics. On the other hand, in the controller 5 which receives an output image signal from the photoelectric conversion elements 14, the output amplitude of the image signal desirably falls within a predetermined range. To this end, the light emission of each LED must be adjusted.

Before the scanning of the original 6 starts, therefore, the white correction plate 7 is read to determine control values of the LEDs 10, 11, and 12. First, the red-color LED 10 is turned on by the maximum pulse width of the period of the read start pulse (Hsync) shown in FIG. 5 (S1). The output amplitude of an image signal corresponding to this light emission is measured to check whether the measured value exceeds a specified value (S2). If the measured value exceeds the specified value, the ON pulse width is slightly shortened (S3), and step S2 is again performed. By repeating these steps, a pulse width by which the output amplitude matches the specified value is determined (S4). The same procedure is performed for the green-color LED 11 and the blue-color LED 12.

PWM control is performed in synchronism with the period of the read start pulse (Hsync) by the ON pulse width determined by the above procedure, thereby sequentially turning on the LEDs. If all these emission ON pulses are set at the start points of the read start pulse (Hsync) having a fixed period as indicated by the conventional operation shown in FIG. 11, color misregistration having a width ⅓ times of the width of one color line and color misregistration having a width ⅔ times of the width of one color line occur during color read.

Figure 7:
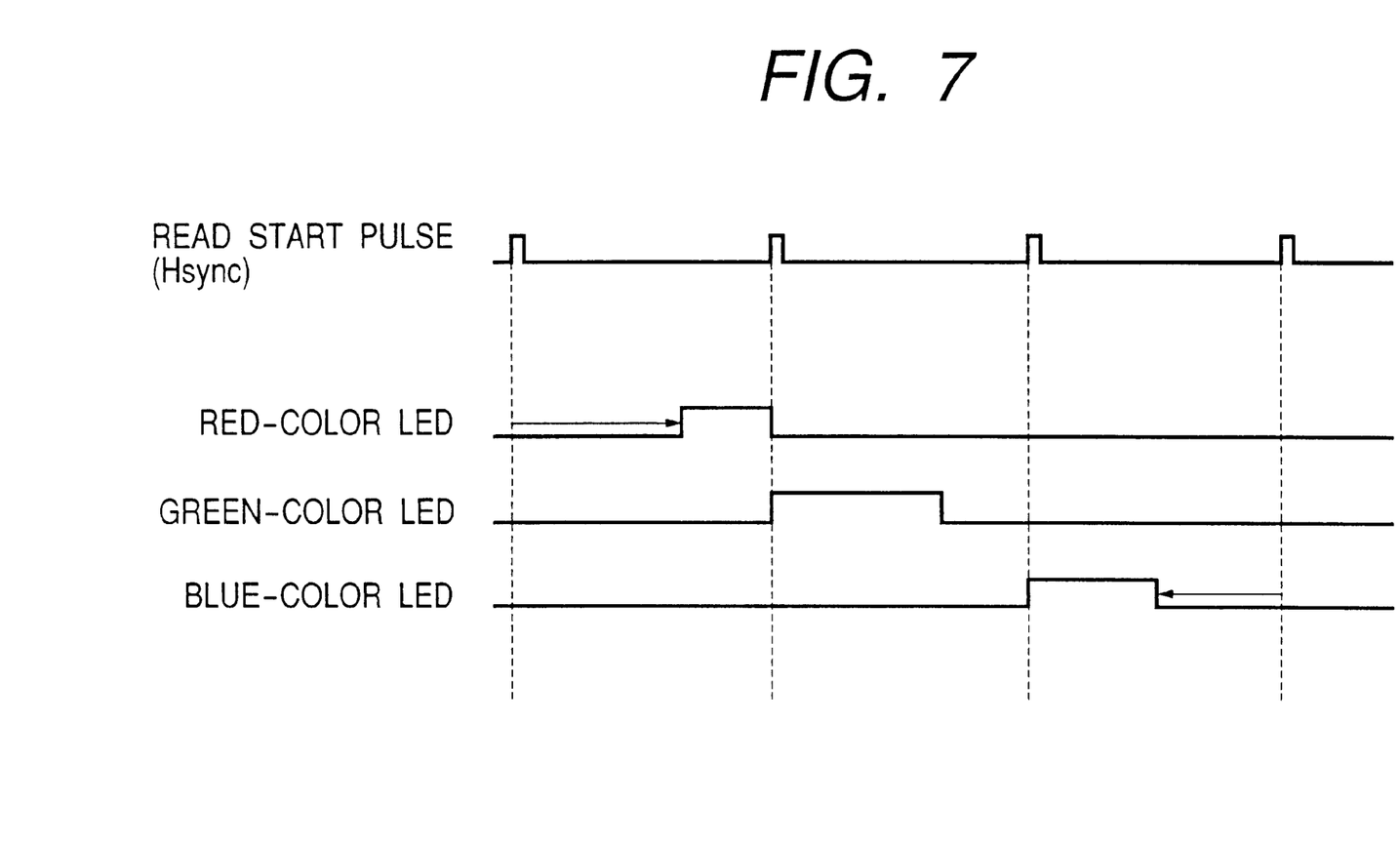
FIG. 7 is a timing chart of an LED PWM control method according to the first embodiment of the present invention.

In this embodiment, therefore, PWM control is performed as shown in FIG. 7 to decrease the color misregistration width. The maximum ON pulse width of each LED is the period of the read start pulse (Hsync). However, a typical ON pulse width is slightly shorter than the period of the read start pulse (Hsync). Hence, one of the red-, green-, and blue-color LEDs 10, 11, and 12 which has the longest ON pulse width is turned on second in the sequential turn-on operation. In this embodiment, this second LED is the green-color LED 11. The remaining LEDs are turned on first and last. In this embodiment, these first and last LEDs are the red- and blue-color LEDs 10 and 12, respectively, and vice versa.

In the first red-color period, the end point of the ON pulse is matched with the start point of the green-color period. In the last blue-color period, the start point of the ON pulse is set at a point same as the end point of the green-color period.

Accordingly, the color misregistration width can be decreased compared to the conventional method.

In this embodiment, in sequentially turning on light sources, a light source having the longest ON period of pulse width control is determined, and the ON periods of other light sources are set close to this longest ON period in a time-series manner. Therefore, the time differences between the light sources can be further decreased. As a consequence, the differences between the irradiation positions of an original decrease, and this decreases the color misregistration.

The second embodiment will be described next.

Figure 8:
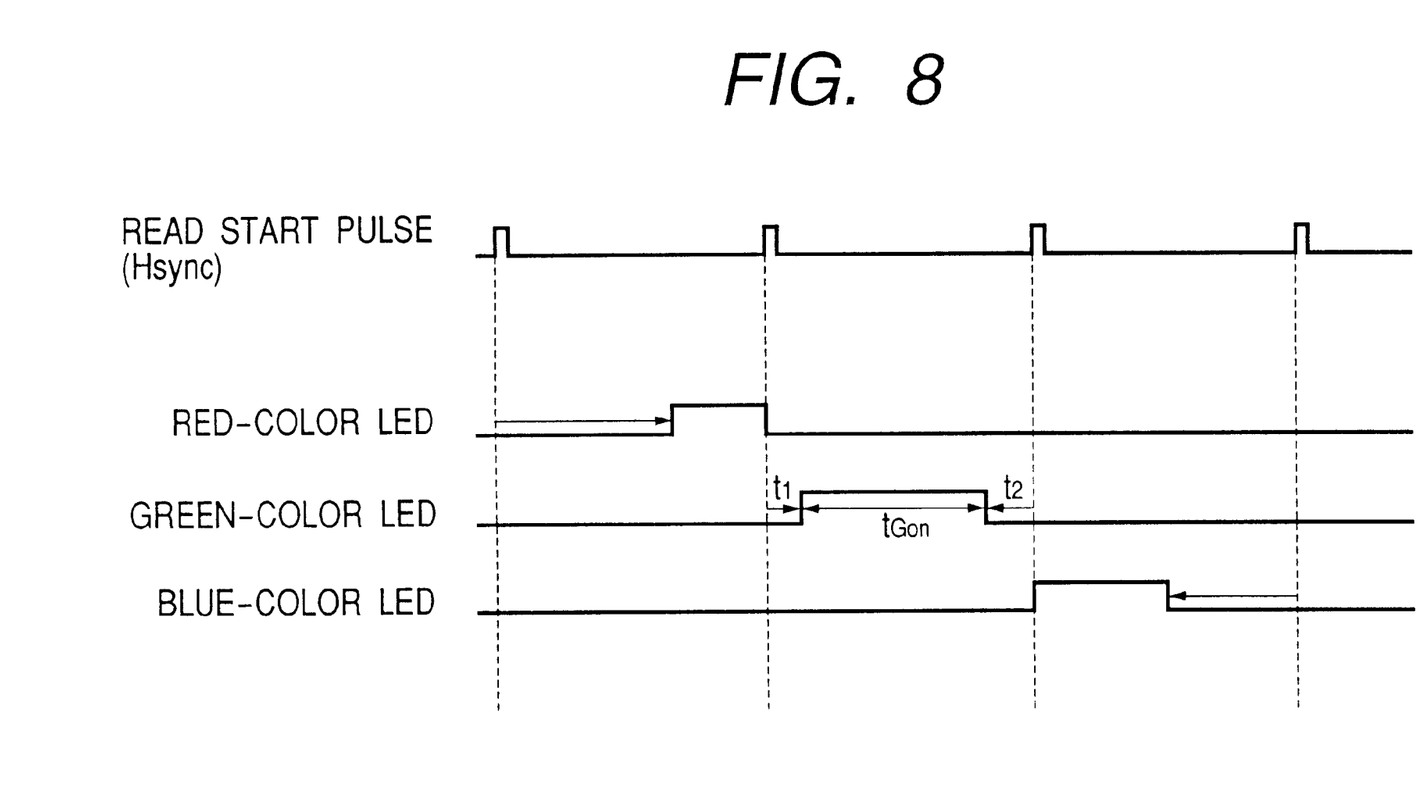
FIG. 8 is a timing chart of an LED PWM control method according to the second embodiment of the present invention.

In this embodiment, the ON period of a green-color LED 11 having the longest pulse width is set near the center of a sequential turn-on switching period, i.e., a read start pulse (Hsync) period. FIG. 8 shows PWM control waveforms in this embodiment.

Times t1 and t2 are calculated by $$t1+t2=T-tGon$$

$$t1+(tGon/2)=t2+(tGon/2) \quad (1)$$

where T: the read start pulse (Hsync) period, and tGon: the ON period of the green-color LED.

In this embodiment, the ON period of a light source having the longest PWM control ON period is set near the center of the sequential turn-on switching period. Therefore, the time differences between the light sources can be further decreased. As a consequence, the differences between the irradiation positions of an original decrease, and this decreases the color misregistration amounts between the colors.

The third embodiment will be described below.

Figure 9:
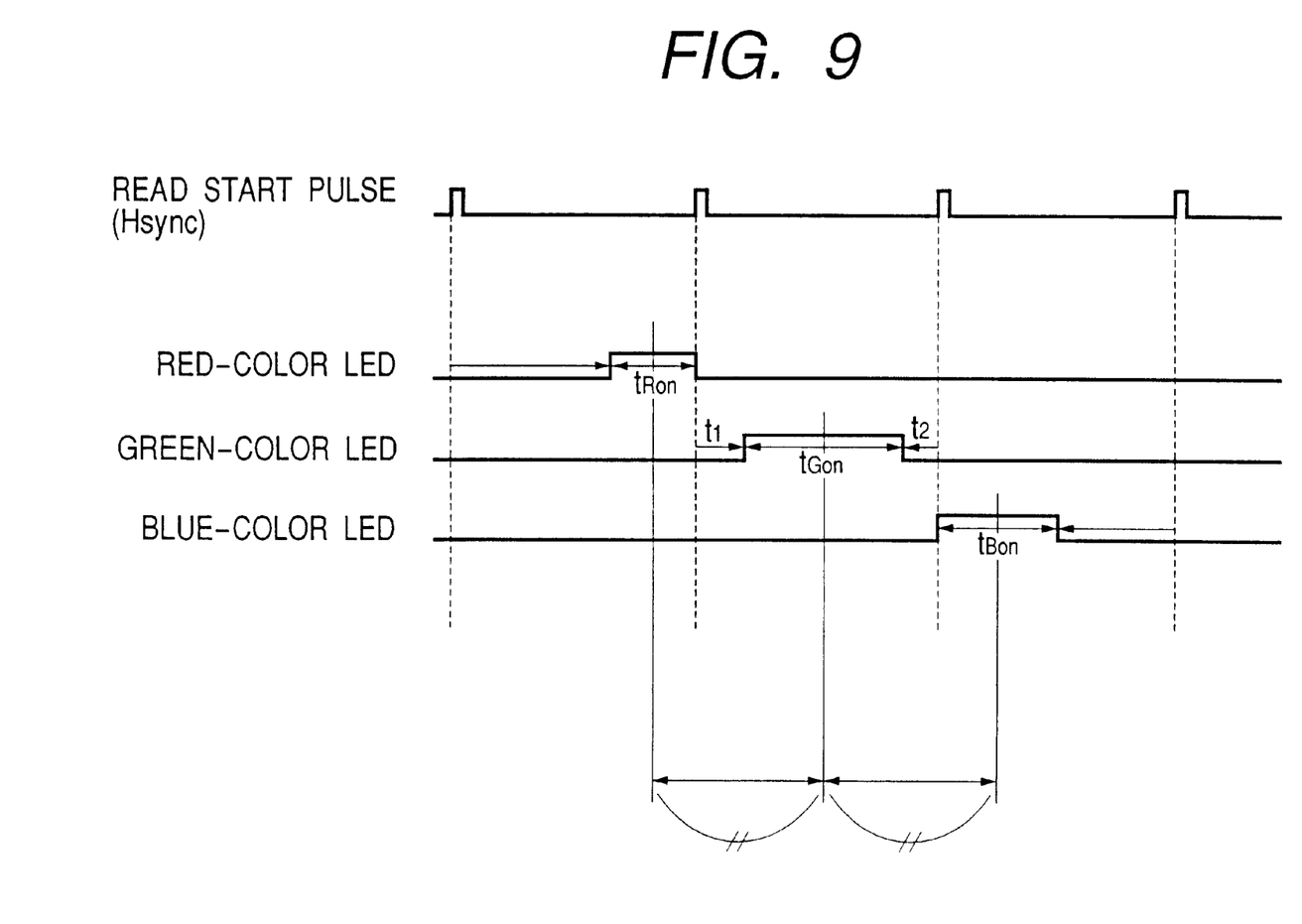
FIG. 9 is a timing chart of an LED PWM control method according to the third embodiment of the present invention.

In this embodiment, as in the second embodiment, the ON period of a green-color LED 11 having the longest pulse width is set near the center of a sequential turn-on switching period, i.e., a read start pulse (Hsync) period. Additionally, the ON period of this light source having the longest pulse width control ON period is set near the center of the pulse width control period such that the timewise central points of the ON periods of light sources before and after the light source in the middle and the timewise central point of the ON period of this middle light source have equal time intervals, in time transition of the sequential turn-on operation. FIG. 9 shows PWM control waveforms in this embodiment.

Times t1 and t2 are calculated by $$t1+t2=T-tGon$$

$$(tRon/2)+t1+(tGon/2)=(tGon/2)+t2+(tBon/2) \quad (2)$$

where T: the read start pulse (Hsync) period, tRon: the ON period of a red-color LED, tGon: the ON period of the green-color LED, and tBon: the ON period of a blue-color LED.

This embodiment can further decrease the time differences between a light source in the middle and light sources before and after this middle light source. As a consequence, the differences between the irradiation positions of an original decrease, and this decreases the color misregistration amounts between the colors.

The fourth embodiment will be described below.

Figure 10:
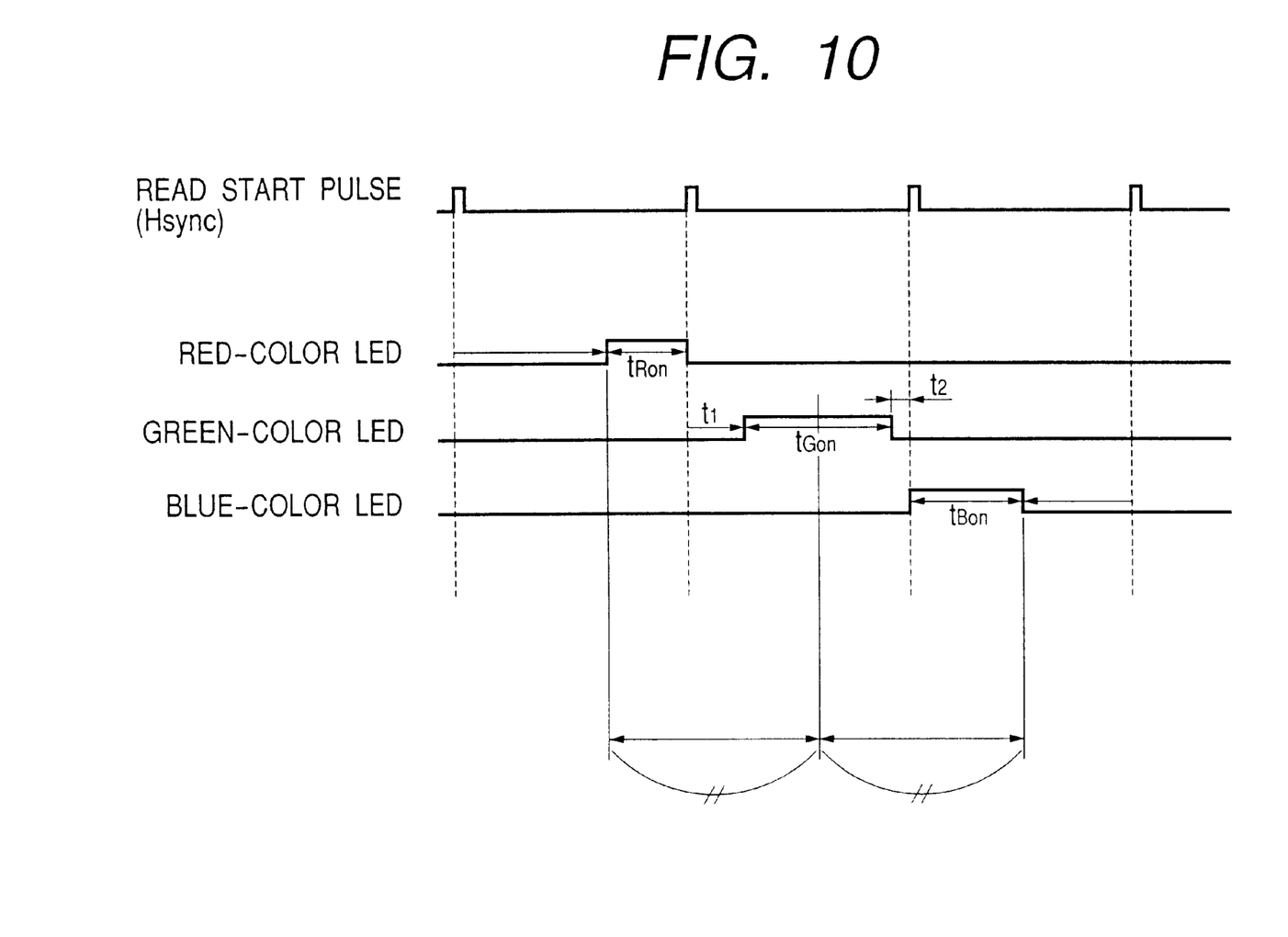
FIG. 10 is a timing chart of an LED PWM control method according to the fourth embodiment of the present invention.

In the fourth embodiment, as in the second embodiment, the ON period of a green-color LED 11 having the longest pulse width is set near the center of a sequential turn-on switching period, i.e., a read start pulse (Hsync) period. Additionally, the ON period of this light source having the longest pulse width control ON period is set near the center of the pulse width control period such that the timewise central point between the start point of the ON period of a light source before the light source in the middle and the end point of the ON period of a light source after the middle light source matches the timewise central point of the ON period of the middle light source, in time transition of the sequential turn-on operation. FIG. 10 shows PWM control waveforms in this embodiment. Times t1 and t2 are calculated by $$t1+t2=T-tGon$$

$$tRon+t1+(tGon/2)=(tGon/2)+t2+tBon \quad (3)$$

where T: the read start pulse (Hsync) period, tRon: the ON period of a red-color LED, tGon: the ON period of the green-color LED, and tBon: the ON period of a blue-color LED. This arrangement can decrease the color misregistration width and the differences between color misregistration amounts of these colors.

This embodiment can further decrease the time differences between a light source in the middle and light sources before and after this middle light source. As a consequence, the differences between the irradiation positions of an original decrease, and this decreases the color misregistration amounts between the colors.

The system including the functional blocks shown in FIG. 1 can be constructed by hardware and can also be a microcomputer system including a CPU, memory, and the like. In the case of a microcomputer system, the memory constructs a storage medium of the present invention. This storage medium records programs for executing the aforesaid procedures. As this storage medium, it is possible to use a semiconductor memory such as a ROM or RAM, optical disk, magnetooptical disk, or magnetic medium. These storage media can be used in the form of, e.g., a CD-ROM, floppy disk, magnetic tape, magnetic card, and nonvolatile memory card.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image reading apparatus comprising:
   a light source unit adapted to emit light components of different colors to illuminate an original;
   a control unit adapted to control said light source unit to sequentially emit said light components so that an emission time period of a predetermined one of said light components is shifted within a respective start pulse period to be closer to an emission time period of a succeeding one of said light components; and
   a photoelectric conversion unit adapted to read an image on the original illuminated by said light source unit and output an image signal while moving relative to the image.

2. An apparatus according to claim 1, wherein said predetermined light component has the longest emission time period among said light components of different colors.

3. An apparatus according to claim 1, wherein said light source unit emits said predetermined light component in the middle of a light emission sequence of said light components of different colors.

4. An apparatus according to claim 3, wherein the emission time period of said predetermined light component is substantially intermediate in point of time between the emission time periods of a preceding light component and said succeeding light component.

5. An apparatus according to claim 4, wherein time intervals between a timewise center of the emission time period of said predetermined light component and timewise centers of the emission time periods of said preceding and succeeding light components are equal.

6. An apparatus according to claim 4, wherein a timewise center of the emission time period of said predetermined light component matches a timewise center between an emission start point of the emission time period of said preceding light component and an emission end point of the emission time period of said succeeding light component.

7. An apparatus according to claim 1, wherein said light source unit comprises three light source means for emitting light components of three primary colors.

8. An image reading method comprising:
   controlling a light source unit, which emits light components of different colors to illuminate an original, to sequentially emit said light components so that an emission time period of a predetermined one of said light components is shifted within a respective start pulse period to be closer to an emission time period of a succeeding one of said light components; and
   reading an image on the original illuminated by said light source unit and outputting an image signal while moving relative to the image.

9. A method according to claim 8, wherein said predetermined light component has the longest emission time period among said light components of different colors.

10. A method according to claim 8, wherein said light source unit emits said predetermined light component in the middle of a light emission sequence of said light components of different colors.

11. A method according to claim 10, wherein the emission time period of said predetermined light component is substantially intermediate in point of time between the emission time periods of a preceding light component and said succeeding light component.

12. A method according to claim 11, wherein time intervals between a timewise center of the emission time period of said predetermined light component and timewise centers of the emission time periods of said preceding and succeeding light components are equal.

13. A method according to claim 11, wherein a timewise center of the emission time period of said predetermined light component matches a timewise center between an emission start point of the emission time period of said preceding light component and an emission end point of the emission time period of said succeeding light component.

14. A method according to claim 8, wherein said light source unit comprises three light source means for emitting light components of three primary colors.

15. A computer-readable storage medium storing programs four executing a control process for controlling a light source unit, which emit light components of different colors to illuminate an original, to sequentially emit said light components so that an emission time period of a predetermined one of said light components is shifted within a respective start pulse period to be closer to an emission time period of a succeeding one of said light components, and a photoelectric conversion process for reading an image on the original illuminated by said light source unit and outputting an image signal while moving relative to the image.

16. A medium according to claim 15, wherein said predetermined light component has the longest emission time period among said light components of different colors.

17. A medium according to claim 15, wherein said light source unit emits said predetermined light component in the middle of a light emission sequence of said light components of different colors.

18. A medium according to claim 17, wherein the emission time period of said predetermined light component is substantially intermediate in point of time between the emission time periods of a preceding light component and said succeeding light component.

19. A medium according to claim 18, wherein time intervals between a timewise center of the emission time period of said predetermined light component and timewise centers of the emission time periods of said preceding and succeeding light components are equal.

20. A medium according to claim 18, wherein a timewise center of the emission time period of said predetermined light component matches a timewise center between an emission start point of the emission time period of said preceding light component and an emission end point of the emission time period of said succeeding light component.

21. A medium according to claim 15, wherein said light source unit comprises three light source means for emitting light components of three primary colors.

* * * * *